US 6,246,392 B1

(12) United States Patent
Wu

(10) Patent No.: US 6,246,392 B1
(45) Date of Patent: Jun. 12, 2001

(54) THIRD-AXIS INPUT DEVICE FOR MOUSE

(76) Inventor: William Wu, 3F, No. 156, Sec. 2, Paofu Rd., Yungho, Taipei Hsien (TW)

( * ) Notice: Subject to any disclaimer, the term of this patent is extended or adjusted under 35 U.S.C. 154(b) by 0 days.

(21) Appl. No.: 09/247,931

(22) Filed: Feb. 11, 1999

(51) Int. Cl.[7] ............................... G09G 5/00; G09G 5/08
(52) U.S. Cl. ........................ 345/163; 345/156; 345/165
(58) Field of Search ............................ 345/156, 163, 345/165

(56) References Cited

U.S. PATENT DOCUMENTS

| 5,635,956 | * | 6/1997 | Tak | 345/165 |
| 5,912,661 | * | 1/1999 | Siddiqui | 345/163 |
| 5,914,705 | * | 1/1999 | Johnson et al. | 345/163 |

* cited by examiner

Primary Examiner—Richard Hjerpe
Assistant Examiner—Duc Dinh
(74) Attorney, Agent, or Firm—Rosenberg, Klein & Lee

(57) ABSTRACT

The inventive third-axis input device is integrally formed and arranged between two racks on the mouse base, which have a predetermined distance therebetween. The third-axis input device comprises a roller, two shafts each extending from lateral side of the roller and arranged on the rack, an encode wheel formed integrally on the first shaft and placed within an IR module of the mouse, the second shaft is corresponding to a micro switch. An abutting wheel is formed integrally with the first shaft and has a plurality of dents and bumps on the rim thereof and having a predetermined separation. A supporting member with elastic displacement is arranged on the base and corresponding to the abutting wheel. The abutting wheel is pushed by the supporting member when the user rotates the roller. The user can feel the lifting and falling movement of the roller and has better feeling for coordinate movement.

5 Claims, 5 Drawing Sheets

THIRD-AXIS INPUT DEVICE FOR MOUSE

FIELD OF THE INVENTION

The present invention relates to an improved structure of third-axis input device for mouse, which is formed in an integral style to save lost and simplify the assembling operation, the roller of the input device has an abutting wheel and a clamping means with resilient movement to provide the user with segmentation felling when operating the roller.

BACKGROUND OF THE INVENTION

As shown in FIG. 5, the conventional third-axis input device for mouse generally comprises a supporting plate 202 upon the base 201 of the mouse 20, a shaft 205 for supporting the roller 203 and the encode wheel 204 and arranged on the supporting plate 202. The roller 203 is such arranged the the top end thereof emerge from the top surface of the mouse 20. Moreover, an IR (infrared) module 206 is arranged beside the encode wheel 204. The user rotates the roller 203 to drive the encode wheel 204 and generates modulation signal, the IR module 206 transmits the module signal to realize the third-axis input function.

However, in above-mentioned third-axis input device, the roller 203 and the encode wheel 204 are separate components axially arranged on the shaft 205 such that separate molding dies are required for the roller 203, the encode wheel 204 and the shaft 205. The cost is increased and the assembling become complicated. Moreover, the roller 203 is rotated continuously and smoothly without stop point, such that it is hard for user to feel the moving location of the cursor.

It is an object of the present invention to provide an improved third-axis input device. To achieve the object, the inventive third-axis input device is integrally formed and arranged between two racks on the mouse base, which have a predetermined distance therebetween. The third-axis input device comprises a roller, two shafts each extending from lateral side of the roller and arranged on the rack, an encode wheel formed integrally on the first shaft and placed within an IR module of the mouse, the second shaft is corresponding to a micro switch. An abutting wheel is formed integrally with the first shaft and has a plurality of dents and bumps on the rim thereof and having a predetermined separation. A supporting member with elastic displacement is arranged on the base and corresponding to the abutting wheel. The abutting wheel is pushed by the supporting member when the user rotates the roller. The user can feel the lifting movement of the roller and has better feeling for coordinate movement.

It is another object of the present invention to provide an improved third-axis input device, wherein the roller, encode wheel and abutting wheel of the inventive device are integrally formed, thus save cost and simplifies the assembling.

The various objects and advantages of the present invention will be more readily understood from the following detailed description when read in conjunction with the appended drawing, in which:

DETAIL DESCRIPTION OF PREFERRED EMBODIMENT

Figure 1:
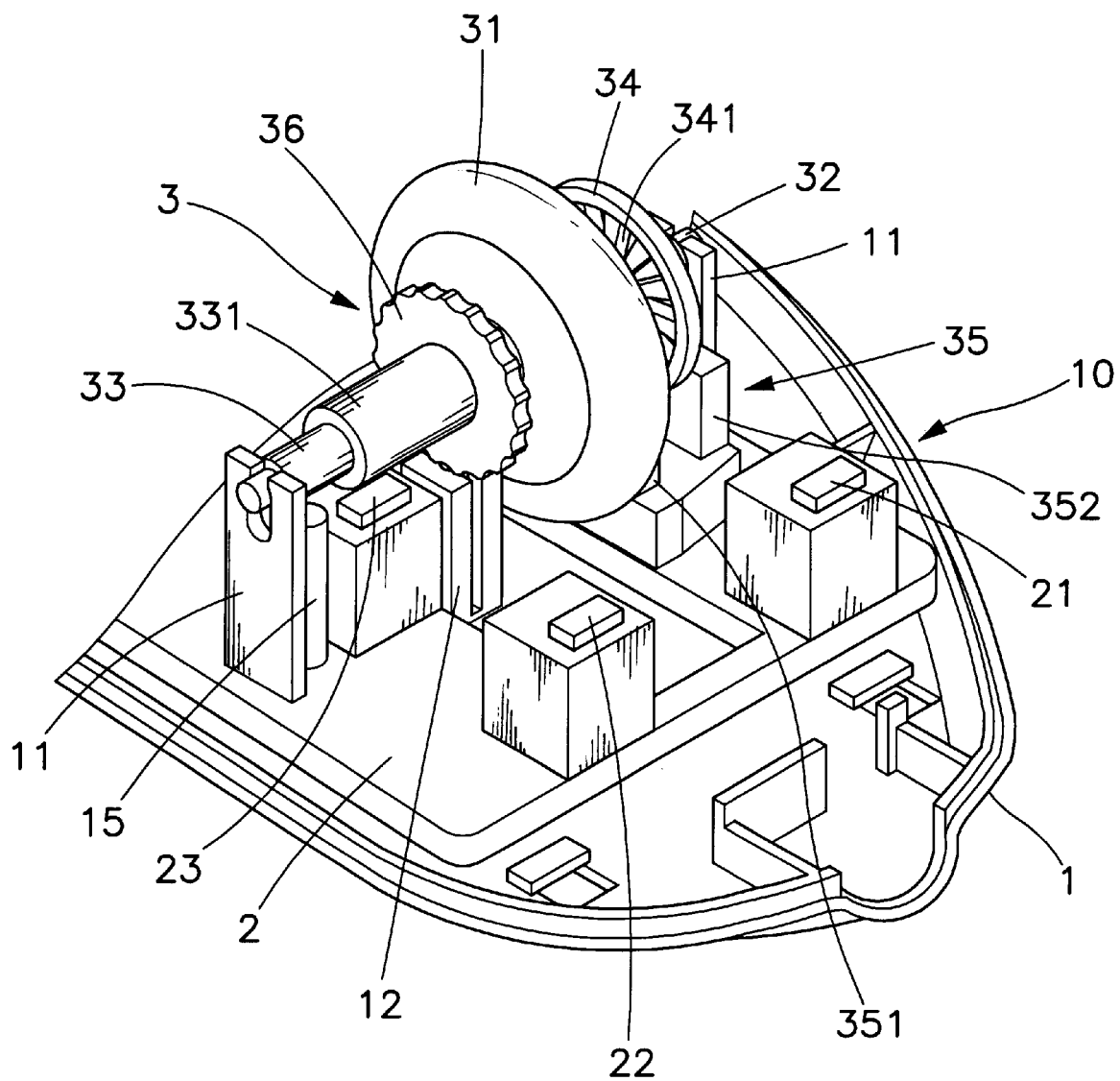
FIG. 1 is the perspective view of the inventive third-axis input device.
Figure 2:
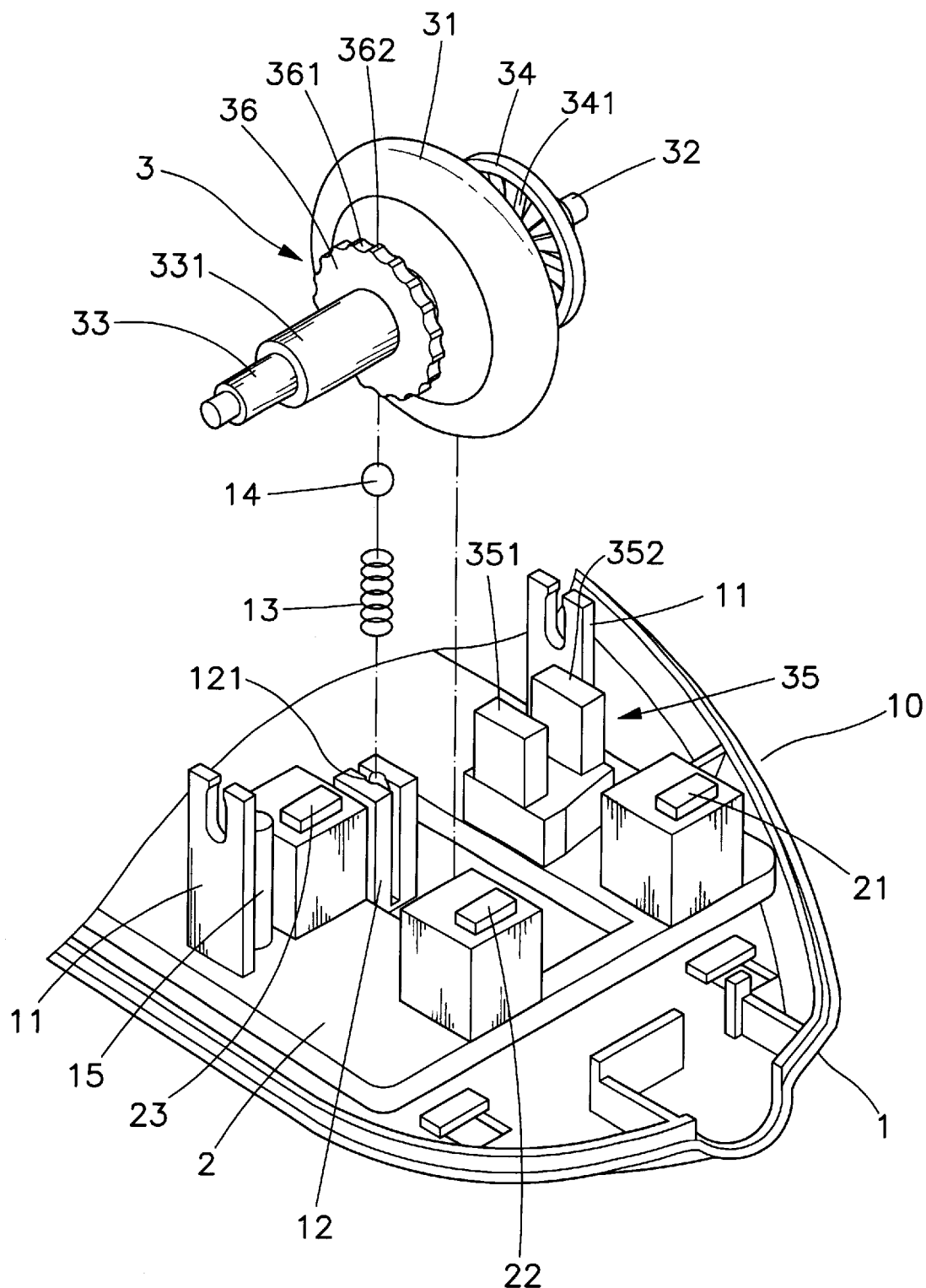
FIG. 2 is a partially exploded view of the invention.

As shown in FIGS. 1 and 2, the device according to the present invention comprises a mouse 10 having a base 1, an upper case (not shown) upon the case 1. A circuit board 2 is arranged within the base 1, a tracking ball mechanism including a tracking ball, and encode wheel is arranged on one side of the circuit board 2. Moreover, a left button switch 21 and a right button switch 22 are arranged on the circuit board 2. However, the above-mentioned structures are not feature of the invention, the description thereof is omitted here for clarity.

In the present invention, an integrally-formed third-axis input device 3 is arranged on one side of the base 1. The input device 3 comprises a roller 31 and a rubber wheel 311 arranged on the roller 31 to enhance the tactual effect. Two pivotal shafts 32 and 33 extend outward from both sides of the roller 31, and two racks 11 are arranged on the base 1 and corresponding to the free ends of the shafts 32 and 33 such that the roller 31 is pivotally arranged between the two racks 11. An encode wheel 34 is integrally formed on one side of the shaft 32 or 33. In the preferred embodiment of the invention, the encode wheel 34 is integrally formed on one side of the shaft 32. A plurality of light-transmitting slits 341 are provided equi-distance on the rim of the encode wheel 34. The inventive device further comprises an IR module 35 having an emitter unit 351 and a receiver unit 352. A flange 331 with larger diameter is arranged on another shaft 33. A center button switch 23 is provided on the circuit board 2 and corresponding to the flange 331 such that the center button switch 23 will be activated when the roller 31 has been pressed.

Moreover, an abutting wheel 36 is integrally formed on one side of the shaft 33 or 32. In the preferred embodiment of the present invention, the abutting wheel 36 is integrally formed on the shaft 33. A plurality of dents 361 and bumps 362 with equal separation are arranged on the rim of the abutting wheel 36. In the present invention, the tooth number ratio of the encode wheel 34 and the abutting wheel is 1:2. For example, in the preferred embodiment, the encode wheel 34 has 9 teeth and the abutting wheel 35 has 18 teeth. In other word, when the encode wheel rotate an angular distance of one slit 341, the abutting wheel will rotate an angular distance of one dent 361 and one bump 362. Moreover, a hollow guiding pole 12 is arranged on the base 1 and corresponding to the location of the abutting wheel 36. An elastic member 13 is provided within the hollow guiding pole 12 and a supporting member 14 is arranged upon the elastic member 13. In the preferred embodiment of the present invention, the elastic member 13 is a spring and the supporting member 14 is a steel ball. The top side of the guiding pole 12 is formed of a hook 121 such that the supporting member 14 is sustained within the guiding pole 12.

In the present invention, a blocking pole 15 extends vertically from the base 1 and corresponding to the location of the shaft 33. A gap is left between the free end of the blocking pole 15 and the shaft 33 such that the shaft 33 will touch the center button switch 23. Therefore, the downward stroke of the roller 31 can be saved because the shaft 33 touches the blocking pole 15.

Figure 3A:
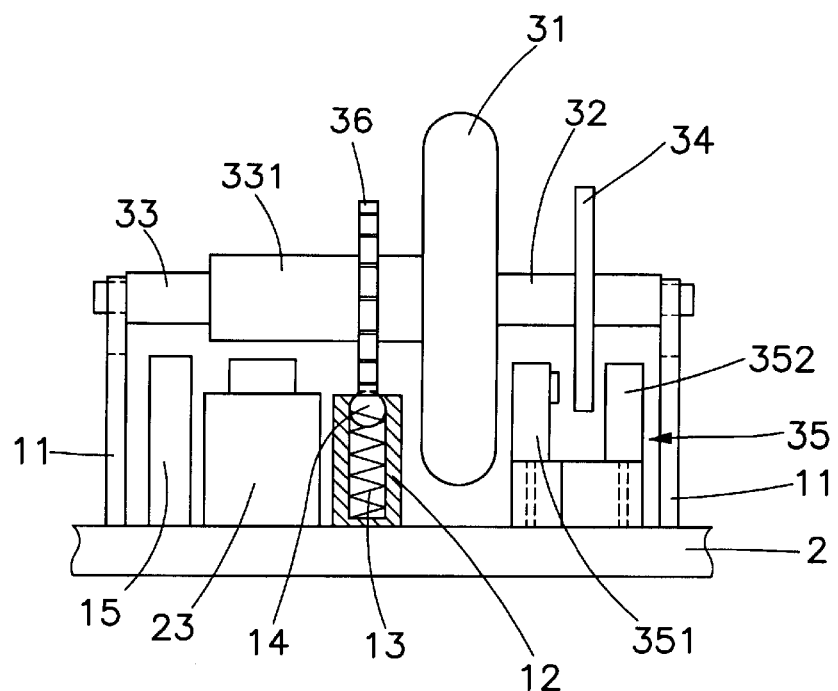
FIG. 3A is a partially cross section view of the invention.
Figure 3B:
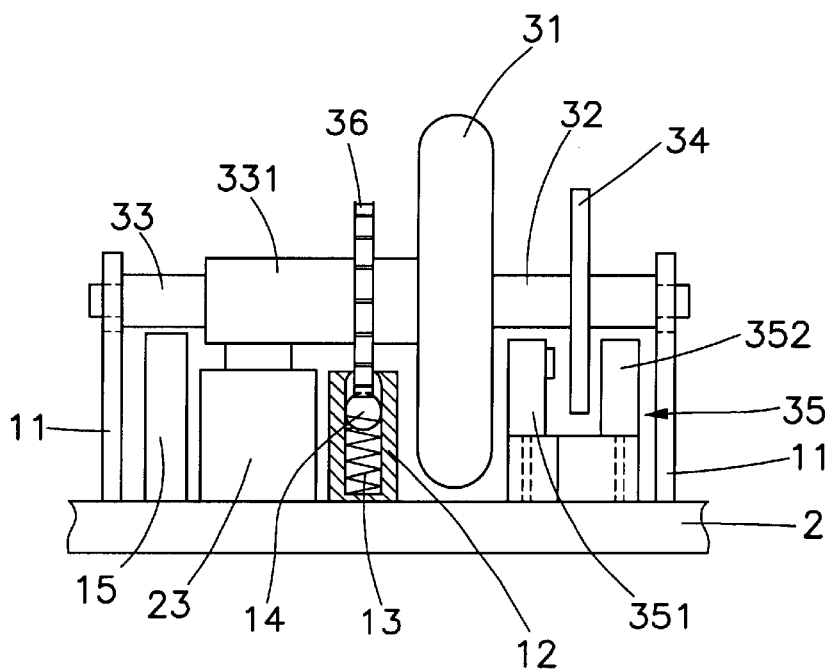
FIG. 3B is another partially cross section view of the invention.

With reference now to FIGS. 3A and 3B, the encode wheel 34 will rotate when the user rotates the roller 31. The rotation of slits 341 on the rim of the encode wheel 34 generate quadrant signals in response to the rotation of roller 31, and the quadrant signals are detected by the receiver unit 352 of the IR module 35 to generate digital signals 0 and 1. The control unit on the circuit board 2 controls the third-axis input according to the signal received by the receiver unit 352. When the user depresses the roller 31, the shaft 33 on one side of will touch the corresponding center button switch 23, thus performs the scrolling operation.

Figure 4A:
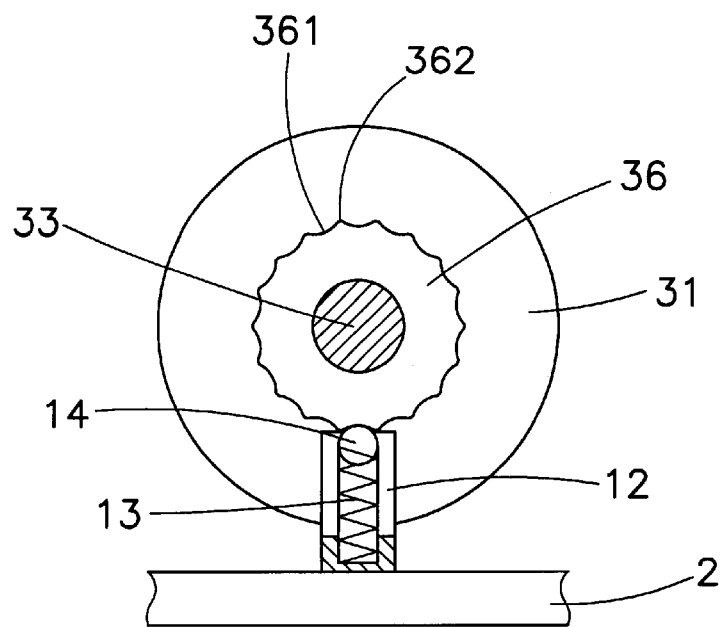
FIG. 4A is a cross section view showing movement of the invention.
Figure 4B:
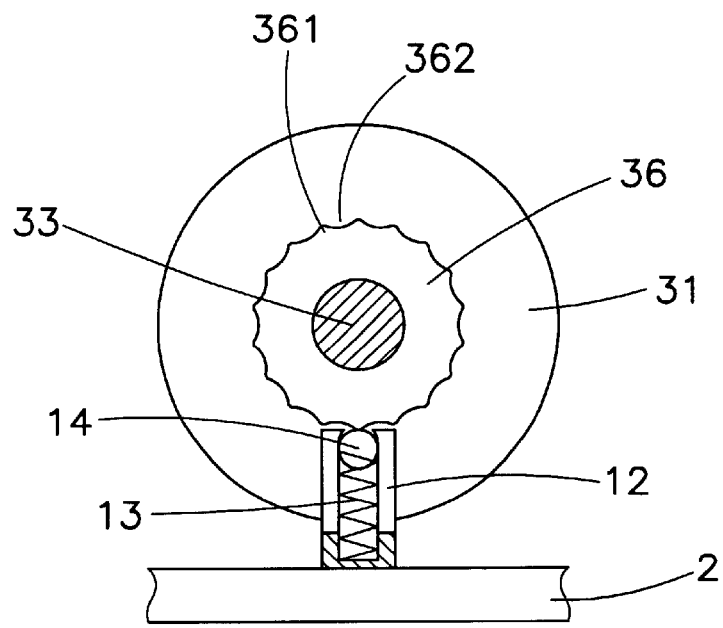
FIG. 4B is another cross view showing movement of the invention.
Figure 5:
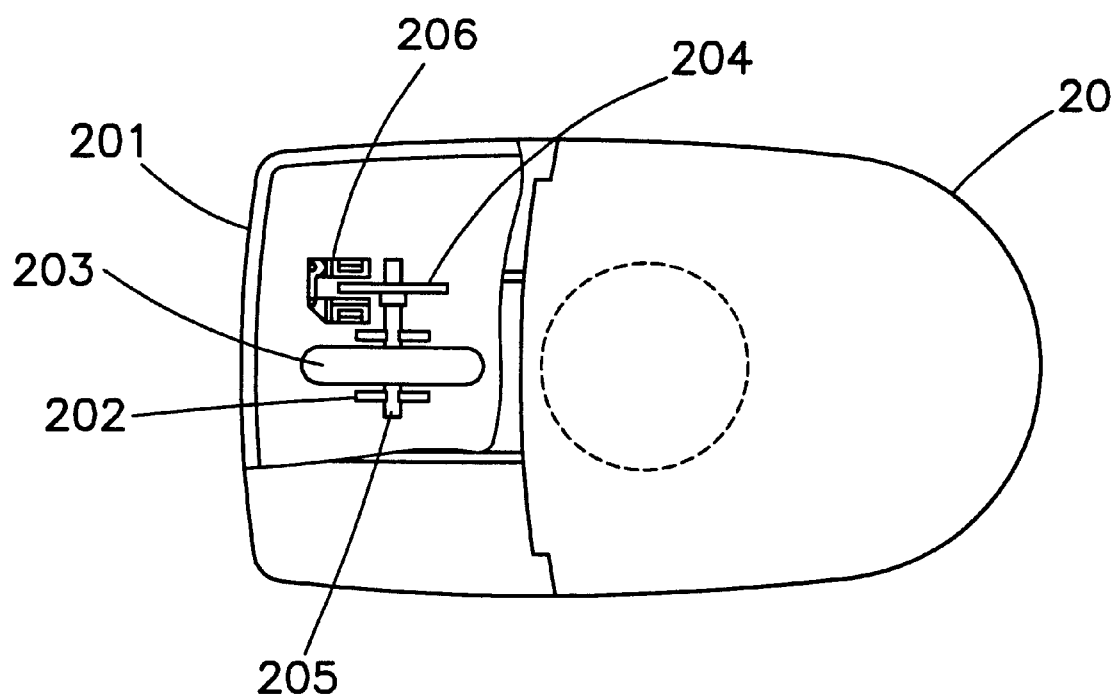
FIG. 5 shows the schematic diagram of a conventional device.

With reference now to FIGS. 4A and 4B, in the present invention, the abutting wheel 36 arranged on the shaft 33 will touch the supporting member 14 when the user rotates the roller 31. The user feels a lifting force from the roller 31 when the bumps 362 of the abutting wheel 36 touch the supporting member 14, and the user feel a falling force from the roller 31 when the supporting member 14 moves into the dent 361 of the abutting wheel 31. The lifting and falling feeling provided by the roller help the user to feel the third-axis movement.

To sum up, the third-axis input device 3 of the present invention has the integrally formed feature and has the advantages of low-cost and simple assembling. Moreover, the roller 31 provide user with lifting and falling feeling during operation to help the user to feel the third-axis movement.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A third axis input device for a mouse having a base, a circuit board, a tracking ball, a third-axis input device and a cover, said third axis input device comprising:

a roller having two pivotal shafts extending outward from opposing sides thereof;

two racks arranged on said base and disposed in correspondence with said shafts such that said roller is pivotally arranged between said two racks;

an encode wheel integrally formed on one of said two shafts, said encode wheel having a plurality of light transmitting slits provided equidistantly on a rim portion thereof;

an infrared module into which said rim portion of said encode wheel is received;

an abutting wheel integrally formed on another one of said two shafts, said abutting wheel having a plurality of dents and bumps with equal separation arranged on a rim thereof;

a hollow guiding pole arranged on said base in correspondence with said abutting wheel;

an elastic member provided within said hollow guiding pole;

a supporting member arranged upon said elastic member and contacting said abutting wheel; and, a center button switch provided on said circuit board and corresponding to one of said shafts of said roller, said center button switch being activated to roll the scroll bar when said roller has been pressed;

said dents and bumps being pushed by said supporting member when said roller is rolled such that a lifting and falling feeling is fed back to a user.

2. The third axis input device for a mouse as in claim 1, wherein said elastic member is a spring.

3. The third axis input device for a mouse as in claim 1, wherein said hollow guiding pole has a hooked end such that said supporting member can not escape from said hollow guiding pole.

4. The third axis input device for a mouse as in claim 1 or 3, wherein said supporting member is a steel ball.

5. The third axis input device for a mouse as in claim 1, further comprising a blocking pole extending vertically from said base and corresponding to a location of one of said shafts, said blocking pole being spaced sufficiently from said shaft to leave a gap between a free end of said blocking pole and the shaft such that the shaft will touch the center button switch while being limited in vertical displacement.

* * * * *